United States Patent
Kerofsky et al.

(10) Patent No.: US 9,602,830 B2
(45) Date of Patent: Mar. 21, 2017

(54) VIDEO DECODER WITH CONSTRAINED DYNAMIC RANGE

(71) Applicant: Sharp Laboratories of America, Inc., Camas, WA (US)

(72) Inventors: Louis Joseph Kerofsky, Camas, WA (US); Kiran Misra, Vancouver, WA (US); Christopher A. Segall, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 34 days.

(21) Appl. No.: 14/821,522

(22) Filed: Aug. 7, 2015

(65) Prior Publication Data
US 2015/0350665 A1    Dec. 3, 2015

Related U.S. Application Data

(63) Continuation of application No. 13/298,771, filed on Nov. 17, 2011, now Pat. No. 9,167,261, which is a
(Continued)

(51) Int. Cl.
*H04N 7/12* (2006.01)
*H04N 19/44* (2014.01)
(Continued)

(52) U.S. Cl.
CPC ........... *H04N 19/44* (2014.11); *H04N 19/124* (2014.11); *H04N 19/132* (2014.11);
(Continued)

(58) Field of Classification Search
IPC ...................................................... H04N 19/44
See application file for complete search history.

(56) References Cited

U.S. PATENT DOCUMENTS 5,072,295 A    12/1991 Murakami et al.
5,724,097 A    3/1998 Hibi et al.
(Continued)

FOREIGN PATENT DOCUMENTS

EP    1294198 A2    3/2003

OTHER PUBLICATIONS

Fuldseth et al., "Transform design for HEVC with 16 bit intermediate data representation," JCTVC-E243, 5th Meeting: Geneva, CH, Mar. 16-23, 2011, 16 pgs.
(Continued)

*Primary Examiner* — Tracy Y Li
(74) *Attorney, Agent, or Firm* — Chernoff Vilhauer McClung & Stenzel, LLP

(57) ABSTRACT

A technique for decoding video including receiving quantized coefficient level values representative of a block of video representative of a plurality of pixels and a quantization parameter related to the block of video. The technique includes dequantizing the quantized coefficient level values based upon the quantized coefficient level values and the quantization parameter only if the quantized coefficient level values and the quantization parameter are jointly within a predefined range of acceptable values. The technique also includes inverse transforming the dequantized coefficients to determine a decoded residue.

8 Claims, 7 Drawing Sheets

Related U.S. Application Data continuation-in-part of application No. 13/291,004, filed on Nov. 7, 2011, now abandoned.

(51) Int. Cl.
| | |
|---|---|
| *H04N 19/176* | (2014.01) |
| *H04N 19/124* | (2014.01) |
| *H04N 19/132* | (2014.01) |
| *H04N 19/136* | (2014.01) |
| *H04N 19/18* | (2014.01) |
| *H04N 19/184* | (2014.01) |

(52) U.S. Cl.
CPC ......... *H04N 19/136* (2014.11); *H04N 19/176* (2014.11); *H04N 19/18* (2014.11); *H04N 19/184* (2014.11)

(56) References Cited

U.S. PATENT DOCUMENTS

| | | | |
|---|---|---|---|
| 6,480,630 B1* | 11/2002 | Kondo | H04N 19/50 375/240.28 |
| 7,620,103 B2 | 11/2009 | Cote et al. | |
| 7,944,968 B2 | 5/2011 | Winger | |
| 7,949,044 B2 | 5/2011 | Winger et al. | |
| 8,457,210 B2 | 6/2013 | Masuda | |
| 2002/0168112 A1* | 11/2002 | Schwartz | G11B 27/036 382/240 |
| 2003/0147463 A1 | 8/2003 | Sato et al. | |
| 2004/0151253 A1 | 8/2004 | Bossen | |
| 2005/0036545 A1 | 2/2005 | Zhou | |
| 2007/0126853 A1 | 6/2007 | Ridge et al. | |
| 2008/0279473 A1 | 11/2008 | Daly et al. | |
| 2009/0110054 A1* | 4/2009 | Kim | H04N 19/647 375/240.1 |
| 2010/0086032 A1 | 4/2010 | Chen et al. | |
| 2011/0090952 A1 | 4/2011 | Cohen et al. | |
| 2011/0090959 A1 | 4/2011 | Wiegand et al. | |
| 2011/0096826 A1* | 4/2011 | Han | H04N 19/52 375/240.01 |
| 2011/0170794 A1* | 7/2011 | Ogawa | H04N 1/64 382/251 |
| 2011/0222602 A1* | 9/2011 | Sung | H04N 21/235 375/240.12 |
| 2013/0064290 A1 | 3/2013 | Kung et al. | |
| 2013/0114675 A1 | 5/2013 | Guo et al. | |
| 2013/0177240 A1 | 7/2013 | Thoma et al. | |

OTHER PUBLICATIONS

Kerofsky, "Transform Dynamic Range Analysis," JCTVC-E333, 5th Meeting: Geneva, CH, Mar. 16-23, 2011, 6 pgs.

Misra et al., "Enforcing the 16-bit inverse transform dynamic range," JCTVC-E411, 5th Meeting: Geneva, CH, Mar. 16-23, 2011, 5 pgs.

Kerofsky et al., "Structured Level Limits," JCTVC-G719, 7th Meeting: Geneva, CH Nov. 21-30, 2011, 4 pgs.

Wiegand et al., "WD3: Working Draft 3 of High-Efficiency Video Coding," JCTVC-E603, 5th Meeting: Geneva, CH, Mar. 16-23, 2011, 50 pgs., Part 1 of 5.

Wiegand et al., "WD3: Working Draft 3 of High-Efficiency Video Coding," JCTVC-E603, 5th Meeting: Geneva, CH, Mar. 16-23, 2011, 50 pgs., Part 2 of 5.

Wiegand et al., "WD3: Working Draft 3 of High-Efficiency Video Coding," JCTVC-E603, 5th Meeting: Geneva, CH, Mar. 16-23, 2011, 50 pgs., Part 3 of 5.

Wiegand et al., "WD3: Working Draft 3 of High-Efficiency Video Coding," JCTVC-E603, 5th Meeting: Geneva, CH, Mar. 16-23, 2011, 50 pgs., Part 4 of 5.

Wiegand et al., "WD3: Working Draft 3 of High-Efficiency Video Coding," JCTVC-E603, 5th Meeting: Geneva, CH, Mar. 16-23, 2011, 15 pgs., Part 5 of 5.

\* cited by examiner

QUANTIZED COEFFICIENT LEVEL VALUES = f1(QP, QUANTIZED COEFFICIENTS)

QUANTIZED COEFFICIENT LEVEL VALUES = f2(QP, N, QUANTIZED COEFFICIENTS)

BOUND ON QUANTIZED COEFFICIENT LEVEL VALUES = f3(QP, DESIRED BOUND ON DEQUANTIZED COEFFICIENT VALUES)

BOUND ON QUANTIZED COEFFICIENT LEVEL VALUES = f4(QP, N, DESIRED BOUND ON DEQUANTIZED COEFFICIENT VALUES)

FIG. 4

VIDEO DECODER WITH CONSTRAINED DYNAMIC RANGE

CROSS-REFERENCE TO RELATED APPLICATIONS

This application is a continuation of U.S. patent application Ser. No. 13/298,771, filed Nov. 17, 2011, which application is a continuation-in-part of U.S. patent application Ser. No. 13/291,004, filed Nov. 7, 2011.

BACKGROUND OF THE INVENTION

The present invention relates to image decoding with dynamic range constraints.

Existing video coding standards, such as H.264/AVC, generally provide relatively high coding efficiency at the expense of increased computational complexity. As the computational complexity increases, the encoding and/or decoding speeds tend to decrease. Also, the desire for increased higher fidelity tends to increase over time which tends to require increasingly larger memory requirements, increasingly larger memory bandwidth requirements, and increasing hardware complexity. The increasing memory requirements and the increasing memory bandwidth requirements tends to result in increasingly more expensive and computationally complex circuitry, especially in the case of embedded systems.

Referring to FIG. 1, many decoders (and encoders) receive (and encoders provide) encoded data for blocks of an image. Typically, the image is divided into blocks and each of the blocks is encoded in some manner, such as using a discrete cosine transform (DCT), and provided to the decoder. The decoder receives the encoded blocks and decodes each of the blocks in some manner, such as using an inverse discrete cosine transform. In many cases, the decoding of the image coefficients of the image block is accomplished by matrix multiplication. The matrix multiplication may be performed for a horizontal direction and the matrix multiplication may be performed for a vertical direction. By way of example, for 8-bit values, the first matrix multiplication can result in 16-bit values, and the second matrix multiplication can result in 24-bit values in some cases. In addition, the encoding of each block of the image is typically quantized, which maps the values of the encoding to a smaller set of quantized coefficients. Quantization requires de-quantization by the decoder, which maps the set of quantized coefficients to approximate encoding values or de-quantized coefficients. The number of desirable bits for de-quantized coefficients is a design parameter. The potential for large de-quantized coefficient values resulting from the matrix multiplication and the de-quantization operation is problematic for resource constrained systems, especially embedded systems.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 4 illustrates a set of equations.

DETAILED DESCRIPTION OF PREFERRED EMBODIMENT

Figure 1:
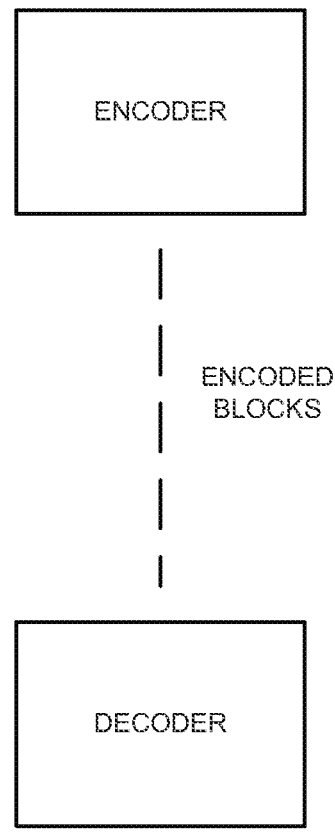
FIG. 1 illustrates an encoder and a decoder.
Figure 2:
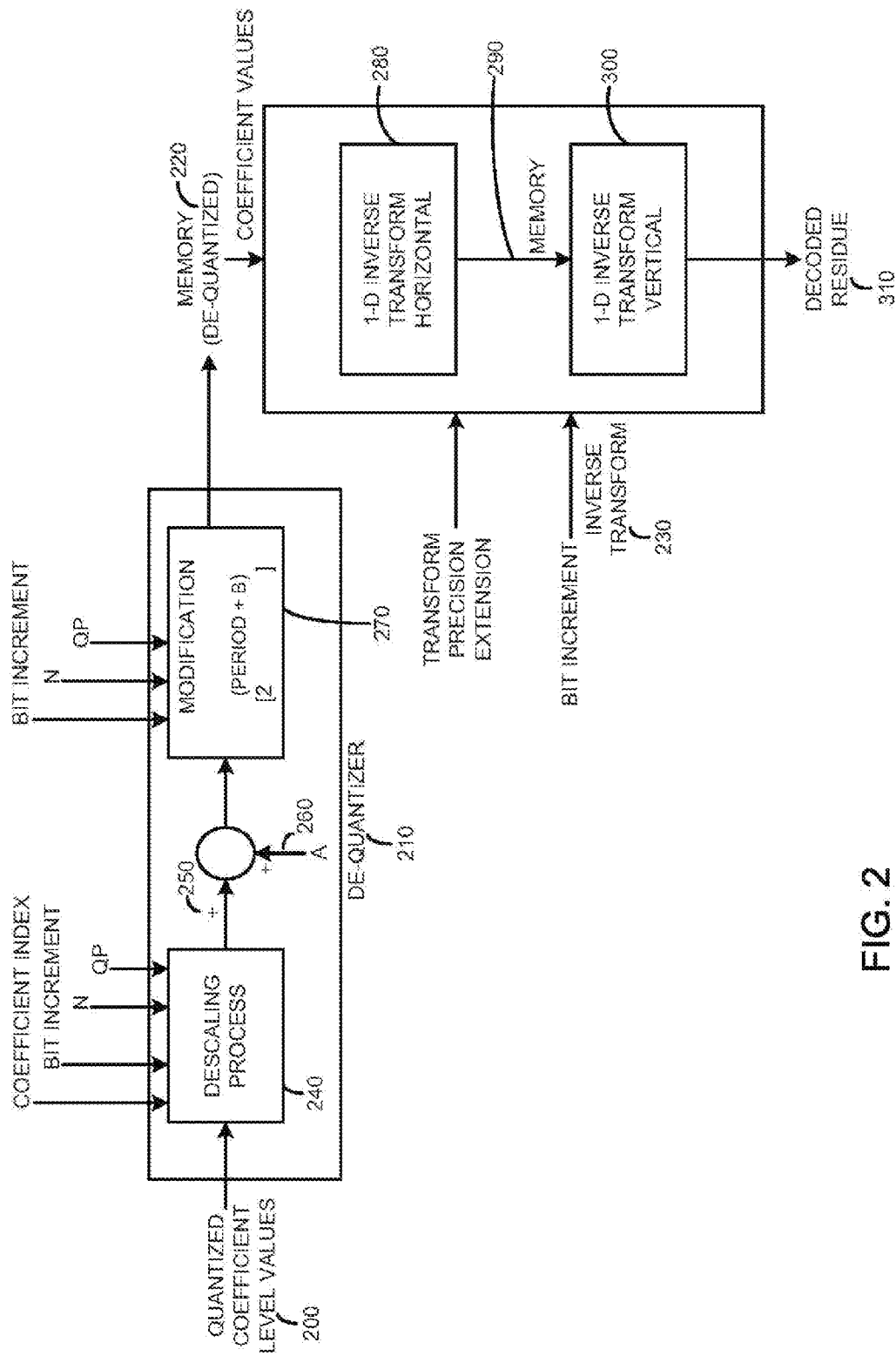
FIG. 2 illustrates a decoder with a de-quantizer and an inverse transform.

Referring to FIG. 2, a decoder for the de-quantization and inverse transformation of the received quantized coefficients from the encoder for a block of the image is illustrated, in relevant part. The decoder receives the quantized coefficient level value 200 at a de-quantizer 210. The de-quantized coefficients resulting from the de-quantizer 210 are stored in memory 220. The de-quantized coefficients stored in memory 220 are then processed by a pair of inverse transforms 230 to determine a decoded residue 310. The pair of inverse transforms map data from a transform domain to a spatial domain using a matrix multiplication operator or other suitable process.

The de-quantizer 210 includes a descaling process 240. The descaling process 240 maps quantized coefficient level values 200 that are transmitted in the bitstream. The descaling process corresponds to multiplying quantized coefficient level values with one integer number dependent on quantization parameter (QP), coefficient index, and transform size (N). An example of the descaling process 240 may include Level*IntegerValue (Remainder, coefficient index) *16 for a de-quantizer used prior to an 8×8 inverse transform and Level*IntegerValue (Remainder, coefficient index) for a de-quantizer used prior to other transform sizes, where Level denotes the quantized coefficient level value, IntegerValue is the integer number. The descaling process 240 is preferably based upon a function of a remainder, transform size, and/or a coefficient index (e.g., position), to determine an intermediate set of values 250. The remainder is the sum of the quantization parameter (QP)+P*BitIncrement modulo P ((QP+P*BitIncrement)% P). Modulo as defined in the H.264/AVC standard is defined as: x % y, as remainder of x divided by y, defined only for integers x and y with x>=0 and y>0. In one embodiment P may take on the value 6. An adjustment mechanism A 260 may be applied to the values 250, which may be a variable dependent on transform size and/or a function of a received Period. The period is the sum of the quantization parameter (QP)+P*BitIncrement divided by P ((QP+P*BitIncrement)/P), where "BitIncrement" is the bit depth increment. The "/" as defined in the H.264/AVC standard is defined as: integer division with truncation of the result towards zero. For example, 7/4 and −7/−4 are truncated to 1 and −7/4 and 7/−4 are truncated to −1. In one embodiment P may take on the value 6. The resulting values 250, possibly further modified by mechanism A 260, may be further modified by a factor of $2^{(Period+B)}$ 270. B is a variable that is dependent on the transform size. The results of the modification 270 are de-quantized coefficient values and stored in the memory 220. The inverse transformation 230 may perform a 1-dimensional inverse horizontal transform 280, which is stored in memory 290. The inverse transform 230 may also perform a 1-dimensional inverse vertical transform 300, which results in the decoded residue 310. The transforms 280 and 300 may be swapped with each other, as desired.

The memory bandwidth of the memory storage 220 the video decoder illustrated in FIG. 2, when implemented within the "Part 10: Advanced Video Coding", ISO publication: ISO/IEC 14496-10:2005—Information Technology—Coding Of Audio-Visual Objects (incorporated by reference herein) (H.264/AVC standard), may be limited by using a constraint. For example, in section 8.5.10 of the H.264/AVC standard, the width of the memory access for 4×4 luma DC transform coefficients is limited by including the following statements: "The bitstream shall not contain data that result in any element $f_{ij}$ of f with i, j=0 . . . 3 that exceeds the range of integer values from $-2^{(7+bitDepth)}$ to $2^{(7+bitDepth)}-1$, inclusive" and "The bitstream shall not contain data that result in any element dc $Y_{ij}$ of dcY with i, j=0 . . . 3 that exceeds the range of integer values from $-2^{(7+bitDepth)}$ to $2^{(7+bitDepth)}-1$, inclusive." The H.264/AVC standard includes similar memory limitation for other transform sizes. In addition to including a complex memory bandwidth limitation, the H.264/AVC standard includes no mechanism to ensure that this limitation is enforced. Similarly, the JCT-VC, "Draft Test Model Under Consideration", JCTVC-A205, JCT-VC Meeting, Dresden, April 2010 (JCT-VC), incorporated by reference herein, likewise does not include a memory bandwidth enforcement mechanism. For robustness, a decoder must be prepared to accept bitstreams which may violate these limits as may be caused by transmission errors damaging a compliant bitstream or a non-conforming encoder. To alleviate such potential limitations the decoder frequently includes additional memory bandwidth, at added expense and complexity, to accommodate the non-compliant bit streams that are provided.

In order to provide a more computationally robust decoder with limited memory bandwidth and/or memory storage requirements, the decoder could be modified in a suitable manner. However, while modifying the decoder to reduce the memory requirements, the corresponding rate distortion performance of the video should not be substantially degraded. Otherwise, while the memory requirements may be reduced, the resulting quality of the video will not be suitable for viewing by the audience. The modification 270 results in a doubling of the coefficient value for every 6 steps in the quantization parameter, and thus may substantially increase the size of the memory requirements. The increased value results in one or more zeros being included as the least significant bits.

Figure 3:
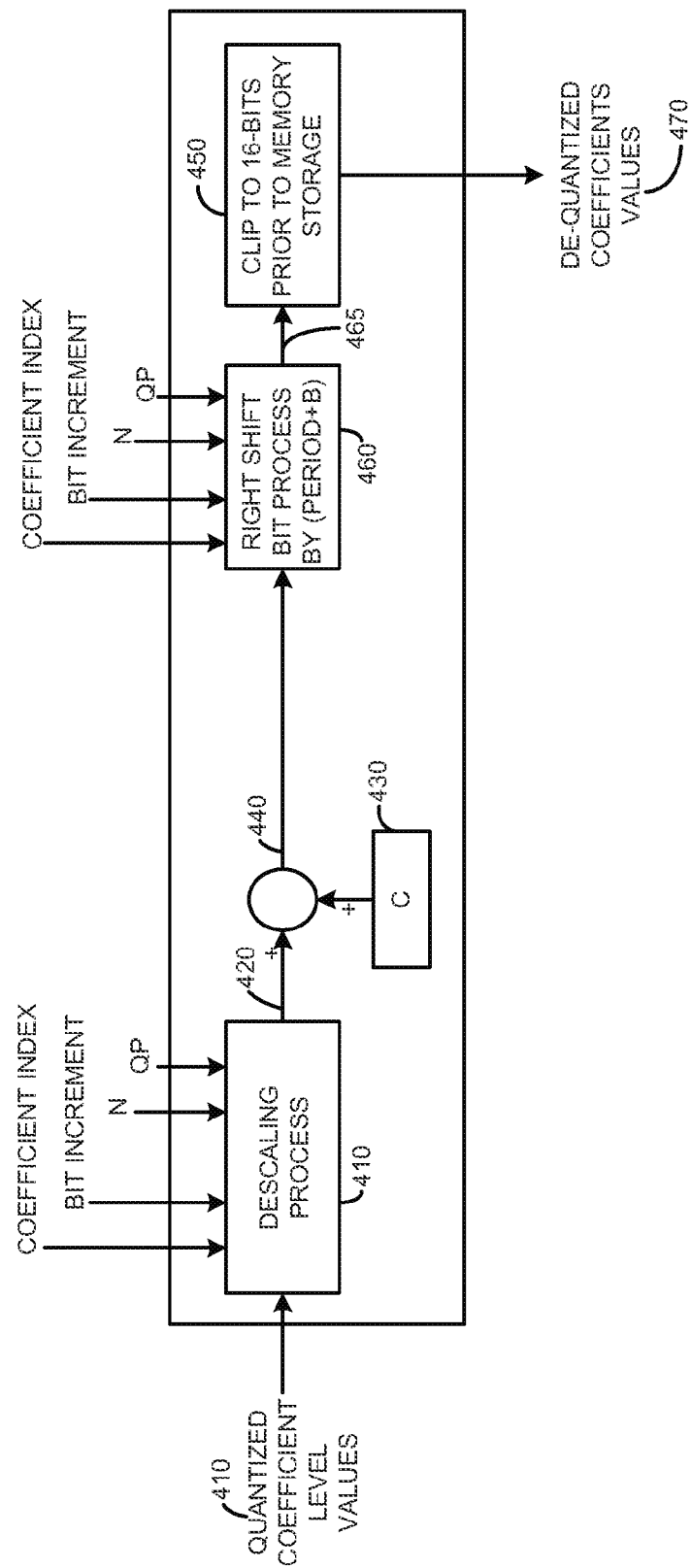
FIG. 3 illustrates another decoder with a de-quantizer and an inverse transform.

Referring to FIG. 3, a modified de-quantizer 400 receives the quantized coefficient level values 405 and descales the quantized coefficient level values using a descaling process 410, preferably based upon a function of a remainder, transform size, and/or a coefficient index (e.g., position), to determine an intermediate set of values 420. An optional adjustment mechanism C 430 may be applied, which is preferably a variable dependent on transform size (N) or a function of a received quantization parameter (QP), to determine resulting data 440. The resulting data 440 with the maximum predetermined bit depth is modified by a factor of $2^{(Period+B)}$ 460. The results of the modification 460 are provided as de-quantized coefficients 465. Preferably, the adjustment mechanism C 430 used for 8×8 transform coefficients is $2^{(5-Period)}$ and the $2^{(Period+B)}$ 460 is $2^{(Period-6)}$. The process 460 may be based upon, if desired, a function of the transform size (N) or a function of a received quantization parameter (QP). Also, the adjustment mechanism C 430 used for other sized transform coefficients (such as 4×4, 16×16, and 32×32) is preferably zero, and the valued of $2^{(Period+B)}$ 460 is $2^{(Period)}$. Also, B may be a function of N and C may be a function of N. The resulting data 440 from the quantized coefficient level values 405 may include rogue data or otherwise is not compliant, and accordingly the modified de-quantizer 400 may impose a fixed limit on the resulting data 440. The resulting data is preferably clipped 450 to a predetermined bit depth, and thus an N×N block of data is stored in memory within the de-quantizer 400 as de-quantized coefficients 470. For example the clipping 450 for a predetermined bit depth of 16 bits results in any values over 32,767 being set to the maximum value, namely, 32,767. Likewise for a predetermined bit depth of 16 bits results in any values less than −32,768 being set to the minimum value, namely, −32,768. Other bit depths and clipping values may likewise be used. In this manner, the maximum memory bandwidth required is limited by the system, in a manner independent of the input quantized coefficient level values. This reduces the computational complexity of the system and reduces the memory requirements, which is especially suitable for embedded systems.

As illustrated, the aforementioned techniques for limiting the dynamic range of the de-quantizer include, (1) placing a non-enforceable normative limit on the dynamic range at various points of the de-quantization, inverse transform and/or reconstruction process, and (2) normative clipping of the de-quantized coefficient data produced from the bitstream prior to the inverse transforms. Both of these techniques attempt to apply a patch to the resulting high dynamic range data prior to it being provided to the inverse transforms, rather than preventing the undesirable high dynamic range data from occurring in the first place. In contrast to applying a patch to the high dynamic range data, it is preferable to limit the syntax of the quantized coefficient level values in the bitstream in such a manner that invalid high dynamic range data does not occur. By placing limits on the bitstream syntax that corresponds to the quantized coefficient level values, high dynamic range constraints may be readily enforced without the need for substantial processing by the decoder and likewise may result in improved video quality. Any quantized coefficient level value which is received that is not within the valid limits may be discarded or detected as an error. An alternate use of these limits is to clip all decoded quantized coefficient level values into the range determined by the bound. This clipping process of level values ensures that the result of the dequantization process is always within the desired limits regardless of the bitstream content. This clipping may be used in conjunction with some limit on the quantized coefficient level values.

The entropy coder may limit the dynamic range of the de-quantized coefficient level values by only including in the bitstream acceptable values, as limited by the syntax of the bitstream. The entropy encoder may use any suitable coder, such as for example, a variable length coder or an arithmetic coder. The encoder provides through the bitstream to the decoder a set of data, including the quantization parameter and the quantized coefficient level values. The decoder along with other data provided, receives the quantization parameter (e.g., QP) and the quantized coefficient level values. The quantization parameter and the quantized coefficient level values should be selected in such a manner, and signaled in the bitstream within permitted ranges in such a manner, to inherently limit the dynamic range following entropy decoding, de-scaling and/or de-quantization. The limits for the entropy coding syntax elements may be derived from such limits.

The bitstream compliance test based on quantized coefficient level values 200 may be carried out at the output of an encoder; or at the input to a decoder; or at both locations and may use the bounds derived using the following process: Referring to FIG. 4, the quantized coefficient level value 200 is determined by a function f1 and/or f2 and values of quantization parameter 401, dequantized coefficient values 220, and possibly transform block size 403 or more generally transform operator. Given a bound on size of dequantized coefficient values 407, the allowable range of quantized coefficient level values 405 is determined by a function f3 and/or f4 for values of quantization parameter 401 and transform block size 403. The allowable range of dequantized coefficient values can be expressed as a bound on the maximum allowable quantized coefficient level value. The determination of the limits for the bitstream syntax that expresses the quantized coefficient level values may be derived from this limit on quantized coefficient level values. For example, if the desired bound on the size of the de-quantized coefficient values is 15 bits plus a sign bit, then this desired bound may be used to determine the maximum for the selection of quantized coefficient level values in the bitstream depending upon the quantization parameter and transform block size. In many cases it is desirable to permit the encoder to select the quantization parameter in a typical manner, and based upon the selected quantization parameter provide an upper bound for the quantized coefficient level values for the bitstream. In this case, the bitstream is structured such that it does not support quantized coefficient level values that are outside of a valid range determined by analysis of the function f1, f2, f3, and f4. As a result, the bitstream does not support values of the Quantized Coefficients, or quantized coefficients, which exceed the desired size.

Another selection of the bound on the quantized coefficient level values 405 is to use the desired bound on the de-quantized coefficients 407 as a maximum, and select values for the quantization coefficient level values based upon a larger number of parameters. In some cases, it may be desirable to permit the encoder to select the quantization parameter in a typical manner and a transform block size (e.g., N) in a typical manner, and based upon the selected quantization parameter and the block size, provide an upper bound for the quantized coefficient level values for the bitstream. In this case, the bitstream is structured such that it does not support values of Quantized Coefficient Level, or quantized coefficient level value, exceeding the bound derived from QP, N, desired size of Quantized Coefficient and f(QP, N, Quantized Coefficients). In some cases, it may be desirable to permit the encoder to select the quantization parameter in a typical manner, a transform block size in a typical manner and a BitIncrement value in a typical manner, and based upon the selected quantization parameter, the transform block size, and BitIncrement value provide an upper bound for the quantized coefficient level values for the bitstream. In this case, the bitstream is structured such that it does not support values of quantized coefficient level values that are outside of a valid range.

In one particular implementation, it is desirable to determine a suitable relation between the desired bound on the de-quantized coefficients, the quantization parameters (e.g., QP), and the quantized coefficient level values signaled in the bitstream. Using a de-quantization relation of JCTVC-E243, one may determine a relation between the desired bound on the de-quantized coefficient values and a desired bound on the absolute quantized coefficient level values. Alternative de-quantization relationships may likewise be used.

For example, for representation in k signed bits, the de-quantized coefficients may be bounded in absolute value by $2^{k-1}-1$, e.g., for 16-signed bits, the absolute de-quantized coefficient level value is limited to $2^{15}-1$, inclusive.

A set of de-quantized coefficient level values may be defined for the determination of the relationship:

B=source bit width (e.g., 8 or 10 bit);

DB=B-8 (internal bit-depth increase with 8-bit input);

N=transform size; Note, in case of non-square transform N represents a 2-tuple vector containing {fd, sd} where fd is the size of the first 1-dimensional inverse transform and sd is the size of the second 1-dimensional inverse transform.

M=log 2(N); Note, in case of non-square transforms M may be a function of sizes of the first and second 1-dimensional inverse transform, for example M=(log 2(fd)+log 2(sd))>>1. Where, x>>y Arithmetic right shift of a two's complement integer representation of x by y binary digits. This function is defined only for positive integer values of y. Bits shifted into the MSBs as a result of the right shift have a value equal to the MSB of x prior to the shift operation.

$Q=f(QP\%6)$, where f(x)={26214,23302,20560,18396,16384,14564}, x=0, . . . , 5

$IQ=g(QP\%6)$, where g(x)={40,45,51,57,64,72}, x=0, . . . , 5

Dequantization which converts a quantized coefficient Level Value, level, and a quantizer parameter QP into a de-quantized coefficient may be given by the following formula:

coeffQ=((level*$IQ$<<($QP$/6))+offset)>>($M$−1+$DB$), offset=1<<($M$−2+$DB$).

An alternate dequantization formula may be given by:

coeffQ=sgn(level)((|level|*$IQ$<<($QP$/6))+offset)>>($M$−1+$DB$),offset=1<<($M$−2+$DB$)

where the function sgn(x) is defined as:

$$\text{sgn}(x) = \begin{cases} -1 & x < 0 \\ 0 & x = 0 \\ 1 & x > 0 \end{cases}$$

When DB=0, this reduces to coeffQ=sgn(level) ((|level|*IQ<<(QP/6))+offset)>>(M−1), The characterization may start with the following relationship: CoefficientB≥([Largest Allowed Quantized Coefficient Level Values*IQ]<<(QP/6)+offset)>>(M−1+DB), where CoefficientB is the bound on the magnitude of de-quantized coefficients; x<<y Arithmetic left shift of a two's complement integer representation of x by y binary digits. This function is defined only for positive integer values of y. Bits shifted into the LSBs as a result of the left shift have a value equal to 0. This relationship is dependent on the de-quantized coefficients, IQ which is a function of the quantization parameter, an offset which depends on the transform size and bit depth, M which is based upon the transform size, and DB which is based upon the source bit width. Thus, the relationship is dependent on the quantization parameter, the de-quantized coefficients, the source bit width, and the transform size. The source bit width may be inherent in the function, depending if more than one bit width is permitted.

The offset shown above accommodates rounding, and the offset may be a non-negative number defined as: 1<<(M−2+DB).

Thus given the desired bound on magnitude of de-quantized coefficient values, the selected bound on quantized coefficient level values may be determined by CoefficientB (N)=[Largest Allowed Quantized Coefficient Level Values*IQ]<<(QP/6)+offset)>>(M−1+DB), where CoefficientB(M) denotes the bound on magnitude of de-quantized coefficient values depending on the transform size N and M=log 2(N).

Solving for the Largest Allowed Quantized Coefficient Level Values, results in the following relationship:

$$\text{Largest Allowed Quantized Coefficient Level Values} = \left\lfloor (CoeffiecientB(N) \ll (M-1+DB) - \text{offset}) \gg \frac{QP}{6} \right\rfloor * \frac{1}{IQ}.$$

For determination of a value of LevelBound(QP,N) sufficient to limit the magnitude of dequantized coefficients, this offset is ignored and the bound is slightly reduced by taking the integer part to simply the form of the LevelBound(QP,N) and still achieve the coefficient bound.

The upper bound on the dequantized coefficients and consequently the, quantization coefficient level values, may depend on transform size N and may be expressed as:

$$LevelBound(QP, M) = \left\lfloor \frac{CoeffiecientB(M)}{IQ} \ll \left(M - 1 + DB - \frac{QP}{6}\right) \right\rfloor.$$

where LevelBound(QP,M) is the largest allowed quantized coefficient value for quantization parameter QP and transform size N, CoeffBound(M) is the bound on magnitude of de-quantized coefficient values for transform size N and M=log 2(N). The operation [x] denotes the integer floor operation i.e. [2.34]=2.

A negative left shift may be interpreted as a corresponding right shift, where a right shift is defined by removing the least significant bit of a number magnitude that is represented in binary form. Since IQ depends on QP%6, the bound levels may be determined based on the desired de-quantized coefficient value bound (possibly depending on transform block size), QP, and the transform block size (M=log 2(transform block size)).

As described, the relationship defining the de-quantization coefficients and de-quantized coefficient level values may have dependence on the transform block size and the quantization parameter. This provides a system with bounds that may be determined by six values of IQ and a modification based on the transform block size and the quantization parameter. A table structure may be exploited to derive a compact expression for the bounds using a doubling property of the bound as transform block size doubles and similar doubling each time QP is increased by 6 due to the term QP/6. Thus only 6 bounds are independent with the remaining values being determined by QP and/or transform block size changes.

Explicit values may be determined for de-quantized coefficients having an absolute value limited to 15-bits and DB equal to zero. For QP ranging from 0-5 and a transform block size of 4×4, one may have the bounds shown below, with bounds for larger transform block size scaled by an appropriate power of two and similarly bounds for larger QP values scaled by a power of two depending upon QP/6. Modifications for nonzero DB or other de-quantized coefficient values limits may be made. Fractional values may be converted to integers slightly reducing the bound in some cases in the list below:

LevelBound(0:5,5)={13106,11650,10279,9197,8191,7281}, where the parameter 5 corresponds to the transform block size of 32 since log 2(32)=5.

A more general relation may be used for the quantized coefficient level value bounds depending on QP, transform block size (N) by M=log 2(N), and the six bounds listed above, such as:

LevelBound(QP, M)=$L_B$[QP%6]>>(M−5+QP/6) where $L_B$(x)={13106,11650,10279,9197,8191,7281} for x=0, 1, 2, 3, 4, 5. In the case of nonzero internal bit-depth increase value DB, an alternate formula may be used: LevelBound (QP,M,B)=($L_B$[QP%6]<<(B−8))>>(5−M+QP/6) where $L_B$(x)={13106,11650,10279,9197,8191,7281} for x=0, 1, 2, 3, 4, 5. Where QP is the quantization parameter, M is determined from the transform block size N by M=log 2(N) and B is the source bit-depth typically B=8 or B=10. The parameter DB=B−8. When DB=0 this is the same result. In addition, a clipping operation may be performed to limit the largest level allowed in the bitstream to LevelBound. When the dequantization process has an additive offset, this bound on levels may be reduced by to account for the dynamic range increase caused by this additive offset. The offset is typically no more than the size of a quantization bin making a reduction of level bound by 1 suffcient to guarantee the desired dynamic range following dequantiation. A modification of the LevelBound formula may be of the form; LevelBound (QP,M,B)=($L_B$[QP%6]<<(B−8))>>(5−M+QP/6)−1 where $L_B$(x)={13106,11650,10279,9197,8191,7281} for x=0, 1, 2, 3, 4, 5. Where QP is the quantization parameter, M is determined from the transform block size N by M=log 2(N) and B is the source bit-depth typically B=8 or B=10.

This bound on quantized coefficient level values may be used to provide a bound on the appropriate syntax element used for the bitstream syntax. For HEVC arithmetic coding of the JCT-VC standard a relevant syntax element is coeff_abs_level_minus3. The syntax element satisfies the following relation:

|transCoeffLevel|=coeff_abs_level_minus3+3.

The bound on the level denoted above determines a bound on the syntax element by subtracting three from the LevelBound defined above to give bounds for QP and transform block size N according to:

$$\text{coeff\_abs\_level\_minus3Bound}(QP, N) =$$
$$(LevelBound(QP\%6, 2) \ll (\log_2(N) - 2)) \gg \left(\frac{QP}{6}\right) - 3$$

With this bound, the quantized coefficient level values will satisfy the bound sufficient to guarantee the de-quantized coefficient values are limited to 16-bits.

For HEVC variable length coding of the JCT-VC standard, a relevant syntax element is level_minus2_and_sign. The relation to the absolute de-quantized coefficient value and the bound on the absolute quantized coefficient level value may be used to determine a bound on this syntax element. This syntax element satisfies that the absolute value of the de-quantized coefficient is equal to (level_minus2_and_sign>>1)+2. Therefore a bound on the absolute quantized coefficient level value determines a bound on level_minus2_and_sign which may be:

|transCoeffLevel|=(level_minus2_and_sign>>1)+2.

A bound on the syntax element may be determined from the bound on the quantized coefficient level value given above as:

$$\text{level\_minus2\_and\_signBound}(QP, N) =$$
$$2 \cdot (\text{LevelBound}(QP\%6, 4) \ll (\log_2(N) - 2)) \gg \left(\frac{QP}{6}\right) - 4.$$

In a system using a quantization matrix where the quantization parameter QP varies per coefficient, the limits may be applied to each element based on the corresponding value of QP. This assumes a quantization matrix is represented by giving a different scalar QP value for each element of a set of de-quantized coefficients and hence each corresponding quantized coefficient level value.

In some embodiments the expressions QP/6 and QP%6 used in [0022] to above may be replaced by Period and Remainder (defined above) respectively. The appropriate level limiting bounds will then have to be recalculated to account for the change.

It is noted that support for fractional bit-shifts may be included. That is when a characterization of A<<B, it also includes the use of the expression $A*2^B$ being used. Equivalently when a characterization of A>>B, it also includes the use of the expression $A*2^{-B}$ being used.

Figure 5:
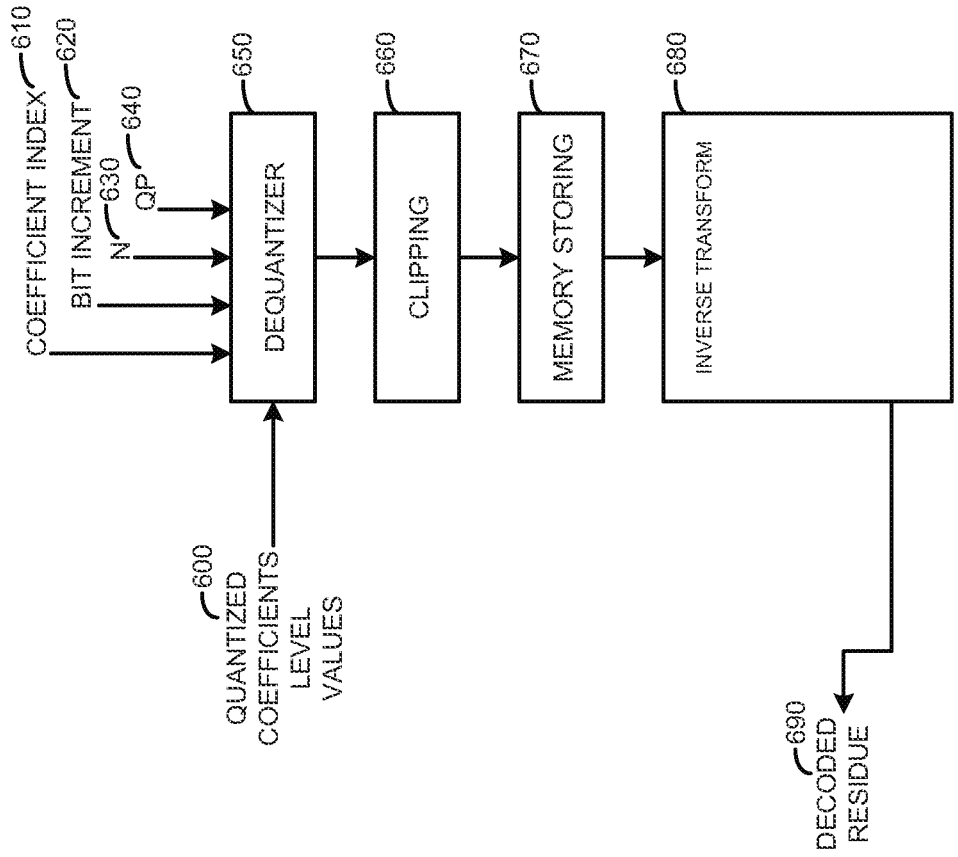
FIG. 5 illustrates a decoder with a de-quantizer and an inverse transform.

Referring to FIG. 5, the decoder may receive the quantized coefficient level values 600, coefficient index 610, bit increment 620, N 630, and/or QP 640. A de-quantizer 650 of any suitable design may be included. The de-quantized coefficients from the de-quantizer 650 may be optionally clipped 660, if desired. The de-quantized coefficients may be stored in memory 670, if desired. An inverse transform 680, such as a pair of 1 dimensional transforms or a 2 dimensional transform, may be used to provide a decoded residue 690.

Figure 6:
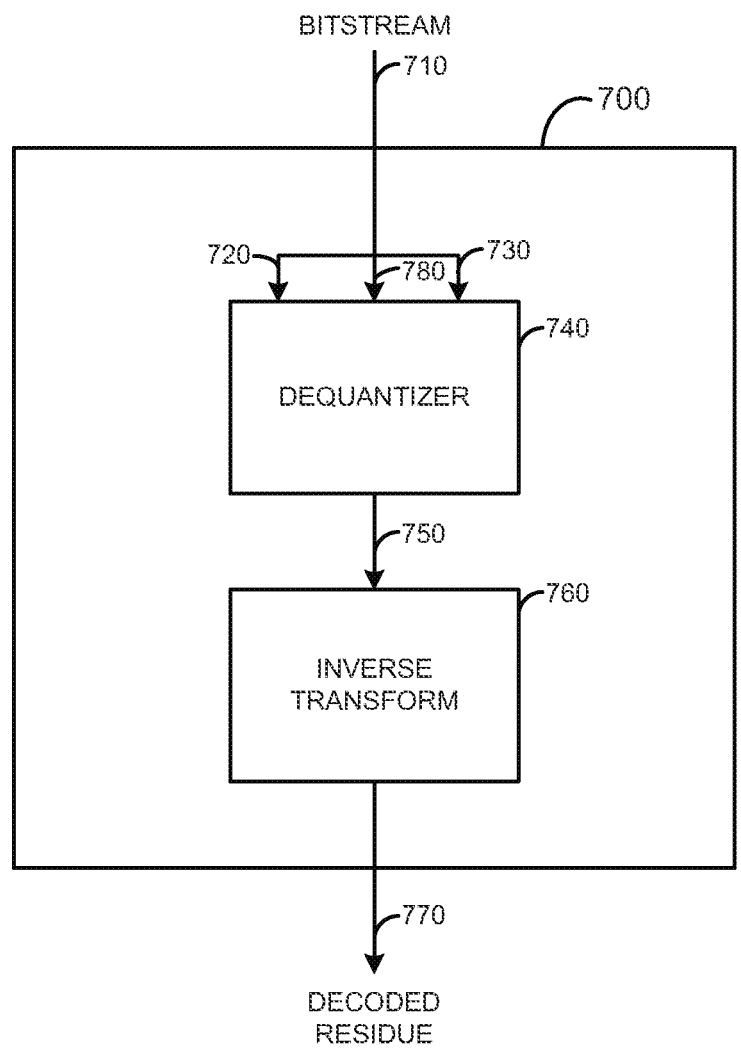
FIG. 6 illustrates a process flow for a decoder.

Referring to FIG. 6, a decoder 700 receives a bitstream 710 containing quantized coefficient level values 720 representative of blocks of video and receives quantization parameters 730 related to blocks of the video. A dequantizer 740 receives the quantized coefficient level values 720 and the quantization parameters 730. The dequantizer 740 dequantizes the quantized coefficient level values 720 based upon both the dequantized coefficient level values 720 and the quantization parameter only if the quantized coefficient level values and the quantization parameters 730 are jointly within a predefined range of acceptable values to limit the dynamic range of the dequantizing. The dequantizer 740 provides dequantized coefficient values 750 to an inverse transform 760 to determine a decoded residue 770. The bitstream 710 may also include transform block size 780 information which is provided to the dequantizer 740 for the dequantization process.

The previous discussion has focused on determining limits on the dequantization process with the goal of using these limits to define illegal values or constrain the syntax support to a desired subset of values only. An additional embodiment is using these limits to enforce clipping of the decoded quantized coefficient level values prior to supplying them to the dequantization process. The dynamic range following dequantization will be limited, which reduces the bit-width needed for the dequantization calculation. This process modifies the traditional quantized level value decoding process to include a clip to a specified range.

Figure 7:
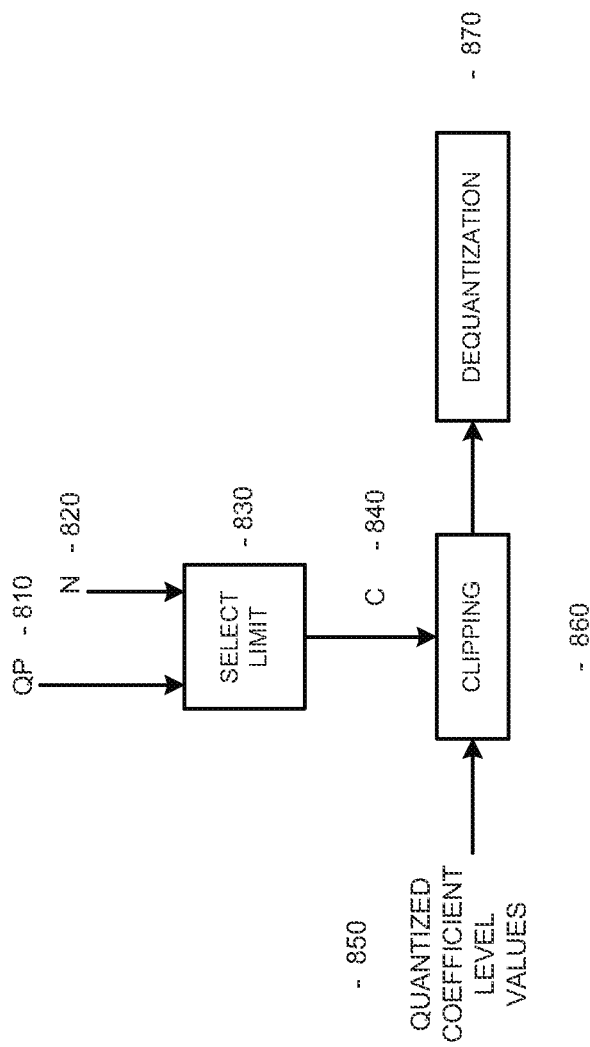
FIG. 7 illustrates a clipping process.

Referring to FIG. 7, a decoder may receive a quantization parameter QP 810, a transform size N 820, and quantized coefficient level values 850. A limit for clipping is selected from QP and N to determine a clipping point C 840 using for example the level limits derived as LevelBound(QP,M) above where M=Log 2(N). The quantized coefficient level values are clipped 860 prior to the dequantization process 870. Alternate embodiments may apply the clipping to the absolute value and then apply the sign to the clipped result.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A decoder that decodes video comprising:
   (a) said decoder receives a bitstream containing quantized coefficient level values representative of a block of video representative of a plurality of pixels and a quantization parameter related to said block of video;
   (b) a de-quantizer of said decoder de-quantizing said quantized coefficient level values based upon said quantized coefficient level values, a transform block size and said quantization parameter when said quantized coefficient level values are within a predefined range of acceptable values;
   (c) said decoder inverse transforming said dequantized coefficients to determine a decoded residue;
   (d) where the bitstream provided to said decoder includes a selective one of a plurality of available restrictions on the permitted level allowed in the bitstream and the selective one is received from the bitstream and the restriction depends on a source bit-depth; and
   (e) a dynamic range of the dequantized coefficient level values is limited based on a desired range of output values of said dequantizer of said decoder.

2. The decoder of claim 1 wherein a syntax of said bitstream does not support said quantized coefficient level values and said quantization parameter outside said range of acceptable values.

3. The decoder of claim 1 wherein said bitstream is encoded using a variable length coder.

4. The decoder of claim 1 wherein said bitstream is encoded using an arithmetic coder.

5. The decoder of claim 1 wherein said range of acceptable values is based upon a selected said quantization parameter and acceptable values of said quantized coefficient level values based upon said selected quantization parameter.

6. The decoder of claim 1 wherein said dynamic range is limited based upon a desired output maximum of said de-quantizer of said decoder.

7. The decoder of claim 1 wherein said dynamic range is limited based on a desired output minimum of said de-quantizer of said decoder.

8. The decoder of claim 1 wherein said predefined range is further based upon a bit depth.

* * * * *